United States Patent [19]

Elderton

[11] Patent Number: 4,862,734
[45] Date of Patent: Sep. 5, 1989

[54] LEAK DETECTION SYSTEM FOR STORAGE TANKS

[75] Inventor: Peter P. Elderton, Fountain Valley, Calif.

[73] Assignee: ITT Corporation, New York, N.Y.

[21] Appl. No.: 263,451

[22] Filed: Oct. 27, 1988

Related U.S. Application Data

[63] Continuation-in-part of Ser. No. 204,973, Jun. 3, 1988, abandoned, which is a continuation of Ser. No. 1,793, Jan. 9, 1987, abandoned.

[51] Int. Cl.⁴ ............................................. G01M 3/26
[52] U.S. Cl. ......................................... 73/49.2; 73/299
[58] Field of Search .............. 73/49.2, 40, 299, 290 R, 73/301; 340/614, 605

[56] References Cited

U.S. PATENT DOCUMENTS

| | | | |
|---|---|---|---|
| 3,460,386 | 8/1969 | Guignard | 73/299 |
| 3,538,746 | 11/1970 | Jacobs et al. | 73/49.2 |
| 3,939,383 | 2/1976 | Alm | 73/49.2 X |
| 4,389,888 | 6/1983 | Morooka | 73/299 |
| 4,627,281 | 12/1986 | Tavis | 73/302 |
| 4,643,025 | 2/1987 | Stone | 340/614 |
| 4,646,560 | 3/1987 | Maresca, Jr. et al. | 73/49.2 |
| 4,739,648 | 4/1988 | Horner | 73/299 |
| 4,791,814 | 12/1988 | Nee | 73/49.2 |

FOREIGN PATENT DOCUMENTS 939948 6/1982 U.S.S.R. ............................... 73/299

*Primary Examiner*—Hezron E. Williams
*Attorney, Agent, or Firm*—Menotti J. Lombardi

[57] ABSTRACT

A leak detection system for detecting the leakage of fluids from storage tanks uses a reference container, such as a standpipe, having its bottom adjacent the level of the bottom of the tank, which is initialized to the same hydrostatic head pressure as the tank, and then closed off. The differential pressure between the hydrostatic head pressures of the standpipe and the tank is monitored over time in an externally mounted differential pressure gauge in order to detect the leakage of fluid from the storage tank. Shut off of valves are provided in a tank pressure pipe and a reference pressure pipe to isolate both sides of the differential pressure gauge. The very high sensitivity of available differential pressure gauges allows the detection of very small leaks and very low leakage rates. A leak detection system of unitary construction may be provided in which the standpipe is provided with an equalizing valve so that the system may be installed through a single hole in the top of a liquid storage tank. In alternate embodiments the standpipe is mounted internally and external to the tank and in an external extension of the tank. In another embodiment a vacuum system is used to draw fluid equally through the differential pressure gauge from both the tank and the standpipe to develop equal negative pressures on each side of the gauge.

2 Claims, 2 Drawing Sheets

LEAK DETECTION SYSTEM FOR STORAGE TANKS

This application is a continuation-in-part of Ser. No. 204,973 filed June 3, 1988 by the same inventor, now abandoned which is a continuation of Ser. No. 001,793, filed Jan. 9, 1987 now abandoned.

FIELD OF THE INVENTION

This invention relates generally to the field of fluid measurement systems, and pertains more particularly to systems for measuring the rate of leakage of fluid from storage tanks.

BACKGROUND OF THE INVENTION

Detecting leakage from fluid storage tanks is a very important problem. For example, leaks from large liquid fuel storage tanks can be very damaging, and detecting such leaks is important in order to allow repair or preventive measures. Detecting leaks when the leak itself is very small or the leakage rate is slow is very difficult using presently available techniques.

The use of pressure transducers to measure the level of a liquid in a tank by measuring the hydrostatic head pressure of the tank is known. However, detecting a small leak by observing changes in the indicated tank level is very difficult using such pressure measurement techniques. This difficulty is caused by the fact that only very small changes in tank level will be observed, and thus the change in the measured hydrostatic head pressure will be very small due to leakage. Also, temperature changes and level changes due to evaporation may be falsely interpreted as leakage indications. The leakage of fluid from tanks may be very undesirable for a number of reasons, including the wastage of costly tank contents and pollution produced by leakage that creates environmental contamination.

Relevant prior art cited in patent applications referenced above, are Jacobs, U.S. Pat. No. 3,538,746 which shows a similar system but with a submerged differential pressure gauge and electrical conductor 36 subject to hazard if used with combustible fluid. Equal head pressure is not maintained. Also, the bottom of pressure chamber 32 is substantially above the bottom of tank 12 creating temperature errors.

Maresca, Jr., et al., U.S. Pat. No. 4,646,560 maintains equal head pressures but again the DPU is submerged.

Guignard, U.S. Pat. No. 3,460,386, Tavis, U.S. Pat. No. 4,627,281, Morooka, U.S. Pat. No. 4,389,888, Knapff, U.S. Pat. No. 3,537,298, Plegat, U.S. Pat. No. 3,921,436, Alm, U.S. Pat. No. 3,939,383, and Torre, U.S. Pat. No. 3,527,909 were also cited but are considered less pertinent.

OBJECTS OF THE INVENTION

Therefore, it is an object of this invention to provide a leak detection system which may be used with fluid storage tanks for detecting leakage.

Another object of the invention is to provide a leak detection system for fluid storage tanks in which very small leaks may be detected, and which is relatively insensitive to temperature changes or evaportion of the fluid.

Further objects of this invention are to provide a leak detection system for fluid tanks with a very high sensitivity, great repeatability, low cost, low level of complexity, and being easy to maintain and install.

SUMMARY OF THE INVENTION

According to a principal aspect of the present invention, there is provided a leak detection system to measure the rate of leakage from a tank by detecting the differential fluid pressure between the hydrostatic head pressure of the tank and a reference standpipe pressure. The standpipe is connected to the tank through a equalizing valve so that fluid may be allowed to flow from the tank into the standpipe through the equalizing valve in order to establish a reference hydrostatic head pressure inside the standpipe, which therefore makes the reference pressure equal to the hydrostatic head of the tank at that particular point in time. Next, the equalizing valve is closed in order to seal off the standpipe, and then the differential pressure between the standpipe and the tank is measured for a period of time in order to detect the rate of leakage of fluid from the tank. The standpipe may be positioned inside the tank itself or may be mounted externally. The standpipe and equalizing valve may be constructed as an integral unit for mounting through a single hole in the top of a liquid storage tank. Standpipe and tank shutoff valves may be connected either to the input sides of a differential pressure gauge or to opposite sides to create an equal negative pressure thereon.

DESCRIPTION OF THE PREFERRED EMBODIMENTS

Figure 1:
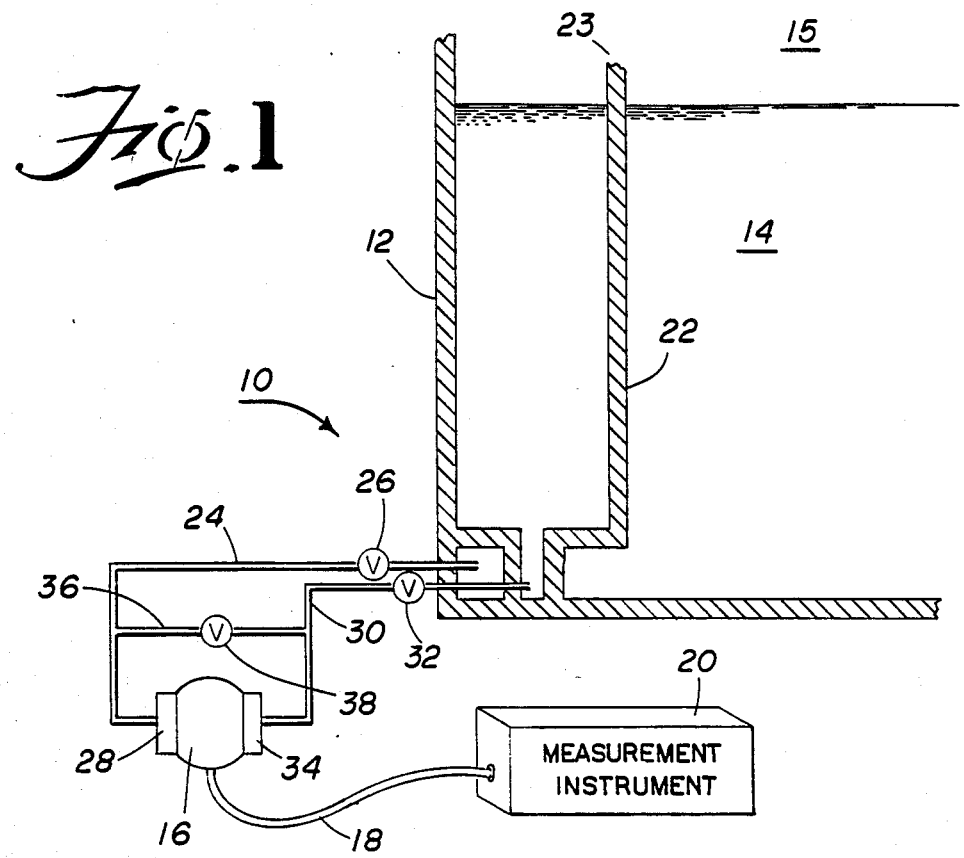
FIG. 1 is a side cut-away view of a liquid storage tank with an internally mounted standpipe and the external leak detection system components shown in symbolic form.

Referring now to the drawings in detail, and first to FIG. 1, a leak detection system 10 is shown which is designed for use with a fuel storage tank 12. The system 10 is constructed to detect the leakage of a liquid fuel 14 from inside the tank 12. The construction of the leak detection system 10 is such that leaks will be detected irrespective of the level of the liquid fuel 14 inside the tank 12, and irrespective of ambient temperature changes or evaporation of the liquid fuel 14 inside the tank 12.

The leak detection system 10 uses a differential pressure gauge 16 for detecting small differences in hydrostatic pressure. The gauge 16 is preferably an ITT Barton model 6001 differential pressure transmitter, a commercially available product. The gauge 16 produces an output electrical signal on a signal wire 18 indicating the measured differential pressure. For application with most liquid fuels, it is preferable that the gauge 16 have an input hydrostatic head pressure differential range of from −0.2 to +0.2 inches of water column (W.C.) For this input pressure range, it is preferable that the gauge 16 produce an electrical signal output on the signal wire 18 in the form of electrical current spanning a range of 4 to 20 milliamperes (mA). The preferred differential pressure gauge 16 has a sensitivity to changes at least as small as 0.001 inch W.C. for the small hydrostatic head pressure changes to be measured and it may be preferable for some applications to have a sensitivity of 0.0001 inch W.C.

The signal wire 18 is connected to the measurement instrument 20 in order to allow electrical measurements to be made to detect the presence of leaks in the tank 12 and the rate of leakage of the liquid 14 from the tank 12. Various designs may be used for the construction of the measurement instrument 20, depending on the particular way in which the leak detection system 10 is to be used. The measurement instrument 20 is located outside the tank 12 in order to avoid problems associated with electricity within tank 12 particularly if liquid 14 is combustible.

The measurement instrument 20 may consist of a conventional electrical indicator, such as a moving coil meter driven by the electrical signal on the wire 18, so that the full scale range of the meter pointer deflection represents a span of −0.2 to +0.2 inches of W.C. detected by the gauge 16. Using such an electrical indicator for the instrument 20 will involve visual observation by the operator, who will manually note the before and after meter indicator readings, and the time elapsed between readings, from which the leakage rate from the tank 12 may be manually calculated. In place of or in addition to an electrical indicator for the measurement instrument 20, a recorder, such as a conventional moving pen strip chart recorder, may be used to provide a graphic record of measured differential pressure changes by the gauge 16 against a time base provided by the recorder.

In place of or in combination with an electrical indicator and recorder for the measurement instrument 20, a microprocessor based recording/computing device programmed for various time periods and engineering units may be used to perform the recording and leak rate calculation functions. Commercially available recording/computing devices such as the ITT Barton MC 3000 or MC 1000 products may be used for this purpose, and may be interfaced with commercially available printers. One recording/computing device may be used as the measurement instrument 20 to process electronic signal data received from several different leak detecting pressure gauges, such as gauge 16, in a large system in which leaks are to be detected from several tanks.

The piping connection arrangement is a very important part of the leak detection system 10. In FIG. 1, a 1" diameter standpipe 22 is mounted to extend vertically upwards inside the fuel storage tank 12 substantially from the bottom thereof. The standpipe 22 is connected by a reference pressure pipe 24 extending through the sidewall of the tank 12, and through a standpipe shutoff valve 26 to the low pressure side port 28 of the gauge 16. A tank pressure pipe 30 extends through the sidewall of the tank 12 and through the tank shutoff valve 32 to the high pressure side port 34 of the gauge 16. The pipe 24 hydraulically couples the inside of the standpipe 22 to the port 28, and the pipe 30 hydraulically couples the inside of the tank 12 to the port 34 both at points substantially on the bottom of tank 12 and at the same fluid level. The gauge 16 measures the differences in pressure between the ports 34 and 28. An equalizing pipe 36 extends through an equalizing valve 38 in order to connect the reference pressure pipe 24 and the tank pressure pipe 30. The equalizing valve 38 may be a manually operated type or it may be an electrical solenoid valve which may be remotely operated by a manually operated switch (not shown) or by circuitry in a recorder/computer device used for the measurement instrument 20.

Figure 2:
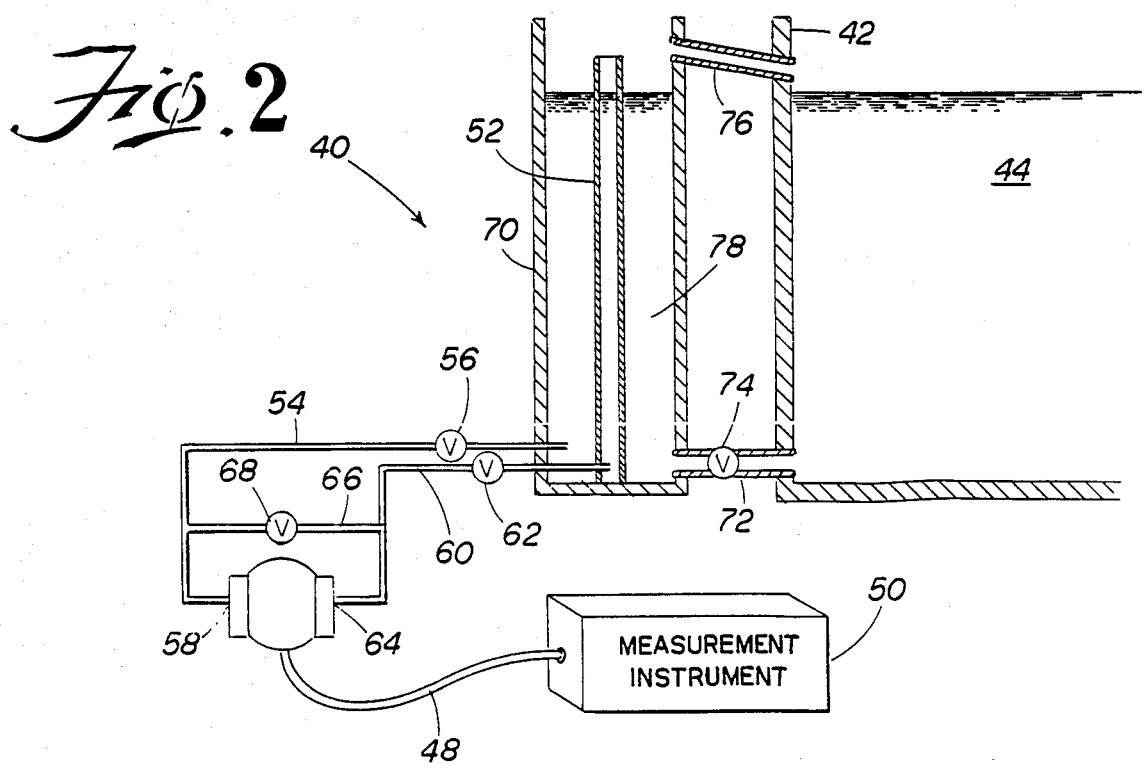
FIG. 2 is a side cut-away view of a liquid storage tank and externally mounted standpipe assembly having both tank fluid and reference fluid levels with leak detection system components shown symbolically.

Referring next to FIG. 2, a leak detection system 40 is shown which is similar in purpose to the system 10 of FIG. 1 and includes analogous parts including a tank 42, liquid fuel 44, differential pressure gauge 46, signal wire 48, measurement instrument 50, standpipe 52, reference pressure pipe 54, standpipe shutoff valve 56, low pressure side port 58, tank pressure pipe 60, tank shutoff valve 62, a high pressure side port 64, an equalizing pipe 66, and an equalizing valve 68.

The leak detection system 40 of FIG. 2 also includes a measurement tank 70 which is mounted externally to the tank 42 and which contains the standpipe 52. A tank transfer pipe 72 and a transfer shutoff valve 74 are provided between the tanks 42 and 70 in order to allow fuel 44 to flow from the tank 42 into the tank 70. An upper vent pipe 76 sloped slightly downward toward tank 42 is provided to allow the free flow of vapors between the upper head spaces of tanks 42 and 70. In the event tank 42 has a floating head on the top of fuel 44, both tanks 42 and 70 are vented to atmosphere. The liquid fuel 78 in the tank 70 is allowed to rise to the same level as the fuel 44 in tank 42 when the transfer shutoff valve 74 is open. The gauge 46 and measurement instrument 50 operate in the same way as gauge 16 and measurement instrument 20, respectively.

The system 40 of FIG. 2 may be advantageous in situations where the system 10 of FIG. 1 may be unsuitable. For example, the system 40 would eliminate some of the costs associated with the installation of the system 10. That is, the system 40 may be installed on an existing tank 42, including connection of the pipes 72 and 76 without requiring the complete draining of the tank 42 of its fuel 44 contents, without requiring the removal of residual fuel traces from inside the tank 42, and without having to send workmen inside the tank 42 for installation of the leak detection system.

Figure 3:
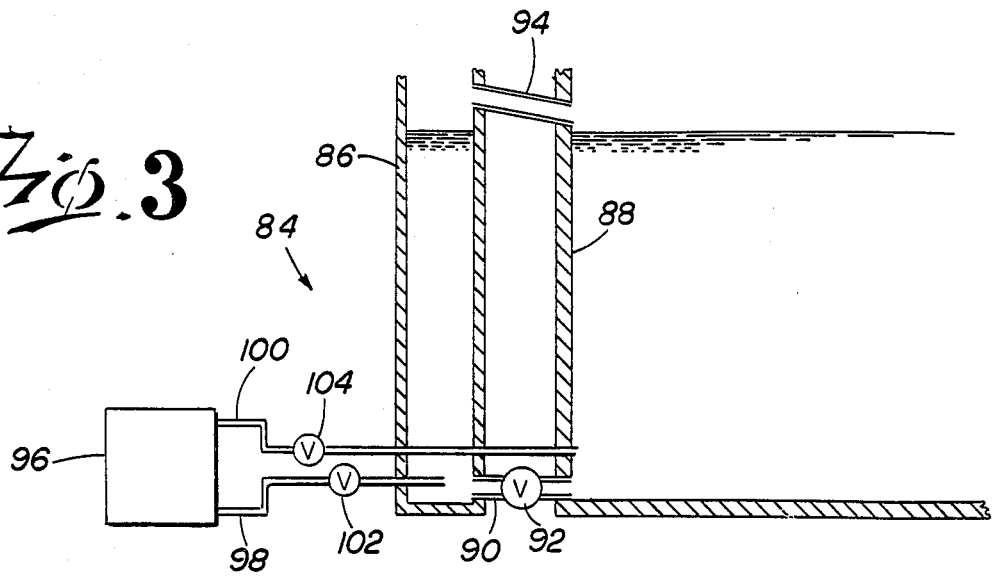
FIG. 3 is a cut-away side view of a storage tank and externally mounted standpipe assembly having only a reference fluid level with leak detection components shown symbolically.

Referring next to FIG. 3, a leak detection system 84 is shown which is similar in function to the systems 10 and 40 shown in FIGS. 1 and 2 respectively. The system includes a standpipe 86 connected to tank 88 at the bottom by equalizer pipe 90 having an equalizing valve 92. Again an upper vent pipe 94 sloped slightly downward toward tank 88 assures the same vapor pressure in the heads of standpipe 86 and tank 88. A DPU 96 is connected to the bottoms of standpipe 86 and tank 88 through conduits 98 and 100 respectively which have shutoff valves 102 and 104 respectively.

Figure 4:
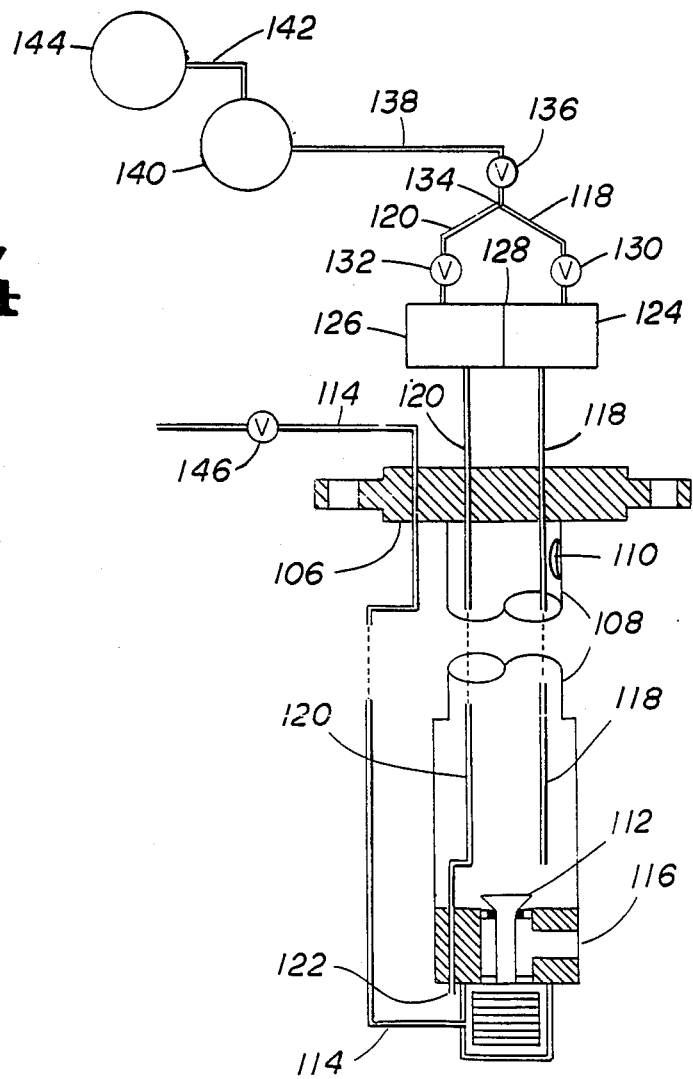
FIG. 4 is a side cut-away view of a standpipe assembly and tank equalizing valve in accordance with an alternate embodiment.

Referring next to FIG. 4, there is illustrated a flange 106 used to mount standpipe 108 through the top of a tank containing liquid (not illustrated). A vent 110 connects the top space of standpipe 108 to the top space of the tank to equalize vapor pressures therein. An equalizing valve 112 may be pneumatically actuated through conduit 114 to open and equalize the fluid levels in standpipe 108 and the tank, as explained previously, through port 116. Fluid conduits 118 and 120 are connected from the bottoms of standpipe 108 and the tank through port 122 through the two sides 124 and 126 of DPU 128 respectively and thence through shutoff valves 130 and 132 respectively and are joined at 134 to one side of shutoff valve 136. The other side of valve 136 is connected by conduit 138 to liquid trap 140 which is connected in turn through conduit 142 to a vacuum pump 144.

OPERATION OF THE INVENTION

Using the leak detection system 10 of FIG. 1, with the level of the liquid fuel 14 at some point above the pipes 24 and 30; the equalizer valve 38, and shutoff valves 26 and 32 are opened. The shutoff valves 26 and 32 are kept open during measurements, but the equalizer valve 38 is only kept open for a sufficient period of time to allow the liquid inside the standpipe 22 to reach the same level as the liquid fuel 14 inside the tank 12. When this equilibrium is reached, the output current electrical signal on the signal wire 18 from gauge 16 will be 12 mA, representing zero differential pressure between the ports 28 and 34 of the gauge 16.

After the appropriate time has passed to reach the equilibrium condition described above, the equalizer valve 38 is closed, locking or trapping the liquid in the standpipe 22 so that no liquid is allowed to flow into or out of the standpipe 22 through the reference pressure pipe 24. At the instant that the equalizer valve 38 is closed, the hydrostatic head pressure is the same on both the high and low pressure side (34 and 28 respectively) of the gauge 16; i.e. zero differential pressure exists across the gauge 16, and the signal output on the wire 18 is 12 mA. When the system 10 is placed in this leak detection mode with the standpipe 22 filled, valves 26 and 32 open, and the equalizing valve 38 closed, the system 10 will detect any small changes producing differences between the liquid level in the standpipe 22 and the liquid level in the tank 12 by measuring the differential pressure across the gauge 16. Small changes in the liquid level of liquid 14 in the tank 12, when not matched by similar changes in the liquid level in the standpipe 22, will produce a pressure difference detected by gauge 16 indicating leakage from the tank 12. The gauge 16 acts to measure the difference between: the liquid column hydrostatic head pressure of the tank 12 taken at the elevation of the gauge 16; and the liquid column hydrostatic head pressure of the standpipe 22 take at the elevation of the gauge 16. Because of the high sensitivity of the gauge 16, very small leaks and low leakage rates from the tank 12 may be detected.

One dynamic condition that should be considered by the user of the system 10 is that adding to or drawing-off the liquid fuel 14 from the tank 12 will produce a change in the level of fuel 14 inside the tank 12, and will produce a false indication of leakage by creating a differential pressure across the gauge 16.

Temperature changes of the fuel 14 inside the tank 12 will effect the specific gravity of the fuel 14, resulting in level changes in both the standpipe 22 and the tank 14. However, both columns of liquid are affected equally with the two liquid levels rising by the same amounts since they are of substantially the same height, with liquid inside the standpipe 22 experiencing the same specific gravity changes as the liquid 14 inside the tank 12, therefore, no erroneous indication of leakage by the system 10 is expected due to any temperature changes of the liquid 14.

If the temperatures and pressures are the same on the upper surface of the liquid (in the head space) inside the standpipe 22 and on the upper surface of the liquid fuel 14 (in the head space) inside the tank 12, evaporation effects inside the standpipe 22 and the tank 12 will be equal. The standpipe 22 has its upper end 23 vented into the head space 15 of tank 12 in order to make sure that the ambient pressures and temperatures applied to the liquids in the standpipe 22 and tank 12 are equal. Therefore, no erroneous indication of leakage by the system 10 due to evaporation of the fuel 14 is expected.

As is true with most electronic instrumentation, ambient temperature changes may produce changes in the performance of the differential pressure gauge 16. There are ways of reducing such temperature effects, such as the use of an ambient temperature sensor (not shown), whose output signal would be used as an input to the measurement system 20 in order to allow for compensation of errors resulting from ambient temperature changes.

The shutoff valves 26 and 32 are usually kept open continuously during the use of the system 10, but may be turned off for maintenance of the gauge 16. The equalizing valve 38 is kept closed during the measurment of leakage from tank 12, but is opened when the tank 12 is being filled or emptied of liquid.

The leak detection system 40 of FIG. 2 is operated in much the same way as the system 10, proceeding with the use of the shutoff valves 56 and 62, and the equalizing valve 68. The transfer shutoff valve 74 is kept open during operation of the leak detection system 40.

Fluid flow through the pipe 72 makes the liquid level inside the tanks 70 and 42 the same. Of course, if the temperature and other conditions in the tanks 70 and 42 are or become different, then there may be extraneous effects on the measurement of the level of tank 42 indicated by the instrument 50. The shutoff valve 74 is ordinarily kept open, but is closed for maintenance of the tank 70. The upper vent pipe 76 connects the head spaces of tank 42, tank 70 and standpipe 52 so that liquids inside each will be exposed to the same ambient temperature and pressure or in the case of a floating top on tank 42 to atmosphere.

The leak detection system 80 of FIG. 3 operates in a manner very similar to the systems 10 and 40 of FIGS. 1 and 2. The equalizer valve 92 is closed unless actuated, and is opened by an air signal for example allowing the fluid in the tank 88 to move in or out of the standpipe 86 through the conduit 90, until the fluid level inside the standpipe 86 is equal to the fluid level in the tank 88. When the two fluid levels are equal, the equalizing valve 92 is closed by removing the air pressure. If the fluid level in the tank subsequently drops due to a leak, the hydrostatic pressure change will be sensed on the pressure gauge 96.

After the installation of standpipe 108 of FIG. 4 in the tank equalizing valve 112 is opened by a remote air signal through valve 146 to allow the fluid in the standpipe 108 to equalize with the level in the tank, then valves 130, 132 and 136 are opened. Vacuum pump 144 is then operated until enough fluid appears in trap 140 indicating both sensing lines 118 and 120 are full. Valve 136 is then closed to allow the system to stabilize. Equalizer valve 112 is then closed isolating the fluid in standpipe 108 from the tank.

Then valves 130 and 132 are closed creating an equal negative pressure on both sides of DPU 128. Any change in the level of the tank will then create a change in the pressure on the tank side 126 of the DPU 128. The output changes of the DPU 128 can then be monitored for the required time period indicating a leak; if any.

The basic operating theory for the leak detection systems of this invention is that measuring the leakage of a fluid from a tank may be accomplished by trapping a reference volume of the fluid at the same pressure as the initial tank pressure, and subsequently measuring the difference between the reference volume pressure and the tank pressure as the tank leaks. The availability of highly sensitive differential pressure gauges makes possible the detection of very small leaks and very small leakage rates. In the case of liquids, leakage is detected by measuring the level of the liquid in a tank, with a falling liquid level indicative of leakage from the tank. The liquid level measurement is not measured directly, but is measured with reference to an initial level, this being accomplished by measuring the hydrostatic head pressure difference between the tank and a reference standpipe. Highly sensitive differential pressure gauges allow such measurements of small pressure changes due to leaks even in the presence of high common-mode hydrostatic pressures.

The leak detection systems of this invention may be used to meet a need only recently recognized, that is, the need to periodically check the performance of storage tanks. For example, in order to prevent dangerous leakage of toxic materials, some governmental agencies require scheduled measurements of leakage rates from tanks used for toxic liquid storage. Specifically, the annual measurement of leakage from underground gasoline storage tanks at service stations may be required. The temporary installation of a leak detection system as shown in FIG. 4 is particularly valuable for this purpose. Such a system may be simply lowered from the top of the tank into the tank, and left in place only long enough to make the desired measurement. Such a system, as in FIG. 4, is both convenient, and portable. Electrical functions are also kept outside the tank to avoid problems associated therewith if the fluid is combustible.

I claim:

1. A leak detection system for detecting the leakage of a fluid from a storage tank having a bottom comprising in combination:

a differential pressure gauge mounted external to said tank having a reference pressure port and a tank pressure port;

a standpipe being mounted in conjunction with said tank, said standpipe having a bottom at a level adjacent that of the bottom of said tank and having an internal reference volume of said fluid;

a standpipe shut-off valve being mounted in a reference pressure pipe coupled between said standpipe and said reference pressure port;

a tank shut-off valve being mounted in a tank pressure pipe coupled between said tank and said tank pressure port;

an equalizing valve coupled between said standpipe valve and said tank valve, said equalizing valve being open for a period of time to allow the fluid volume in said standpipe to reach the same level as the fluid level inside said tank, and said equalizing valve being closed after equilibrium is reached;

means responsive to indicate the difference detected by said gauge in the fluid pressure between said standpipe and tank with said standpipe shut-off valve and tank shut-off valve being in the open condition, whereby the indication is a measure of the leakage of fluid from said tank; and one side of said standpipe shut-off valve and one side of said tank pressure valve are mounted in said reference pressure pipe and said tank pressure pipe respectively on a side of differential pressure transducer away from said reference pressure pipe and said tank respectively and the opposite side of said standpipe and tank shut-off valves are each connected through one side of a bleeder valve to a liquid trap, said liquid trap having a vacuum pump connected thereto in order to draw a vacuum which will draw liquid from both standpipe and tank into said trap to create an equal negative pressure on both sides of said differential pressure gauge.

2. The combination of claim 1 in which said standpipe is mounted internally in said tank.

* * * * *